April 8, 1924. 1,489,802
C. S. TURNER
SPEEDOMETER GEARING FOR STEERING KNUCKLES
Filed April 24, 1922   2 Sheets-Sheet 1

Inventor:
Charles S. Turner
By
Attorneys

Patented Apr. 8, 1924.

1,489,802

UNITED STATES PATENT OFFICE.

CHARLES S. TURNER, OF DETROIT, MICHIGAN.

SPEEDOMETER GEARING FOR STEERING KNUCKLES.

Application filed April 24, 1922. Serial No. 556,253.

*To all whom it may concern:*

Be it known that I, CHARLES S. TURNER, a citizen of the United States of America, residing at Detroit, in the county of Wayne and State of Michigan, have invented certain new and useful Improvements in Speedometer Gearings for Steering Knuckles, of which the following is a specification, reference being had therein to the accompanying drawings.

This invention relates to a speedometer gearing especially designed for the steering knuckles forming part of the front axle assembly of a well known type of automobile, and unsatisfactory results have been heretofore obtained from such speedometer gearing on account of the manner of mounting the gearing relative to the front axle of the automobile. Since the front wheels of the front axle must swing in an arc and since an ordinary steering knuckle affords no convenient place of mounting a gearing it has been practically impossible to obtain positive and reliable transmission between a front wheel and a speedometer. My invention aims to provide a strong, durable and inexpensive mounting for speedometer gearing that may be easily and quickly installed in connection with the usual steering knuckle of a Ford automobile, the mounting at all times maintaining the gearing in an operative relation, relative to a front steering wheel irrespective of the position of the wheel.

My invention further aims to provide a compact speedometer gearing mechanism that may be easily lubricated, and maintained free of dirt and other foreign matter which might cause unnecessary wear and imperfect operation of a speedometer.

My invention further aims to provide a mounting for a speedometer gearing that may be substituted for a portion of a steering knuckle or may be an addition to a portion of the steering knuckle. In either instance, the mounting has a constant relation to the steering wheel and demeshing or stripping of gears is eliminated.

The construction entering into my invention will be hereinafter specifically described and then claimed and reference will now be had to the drawing, wherein—

Figure 1:
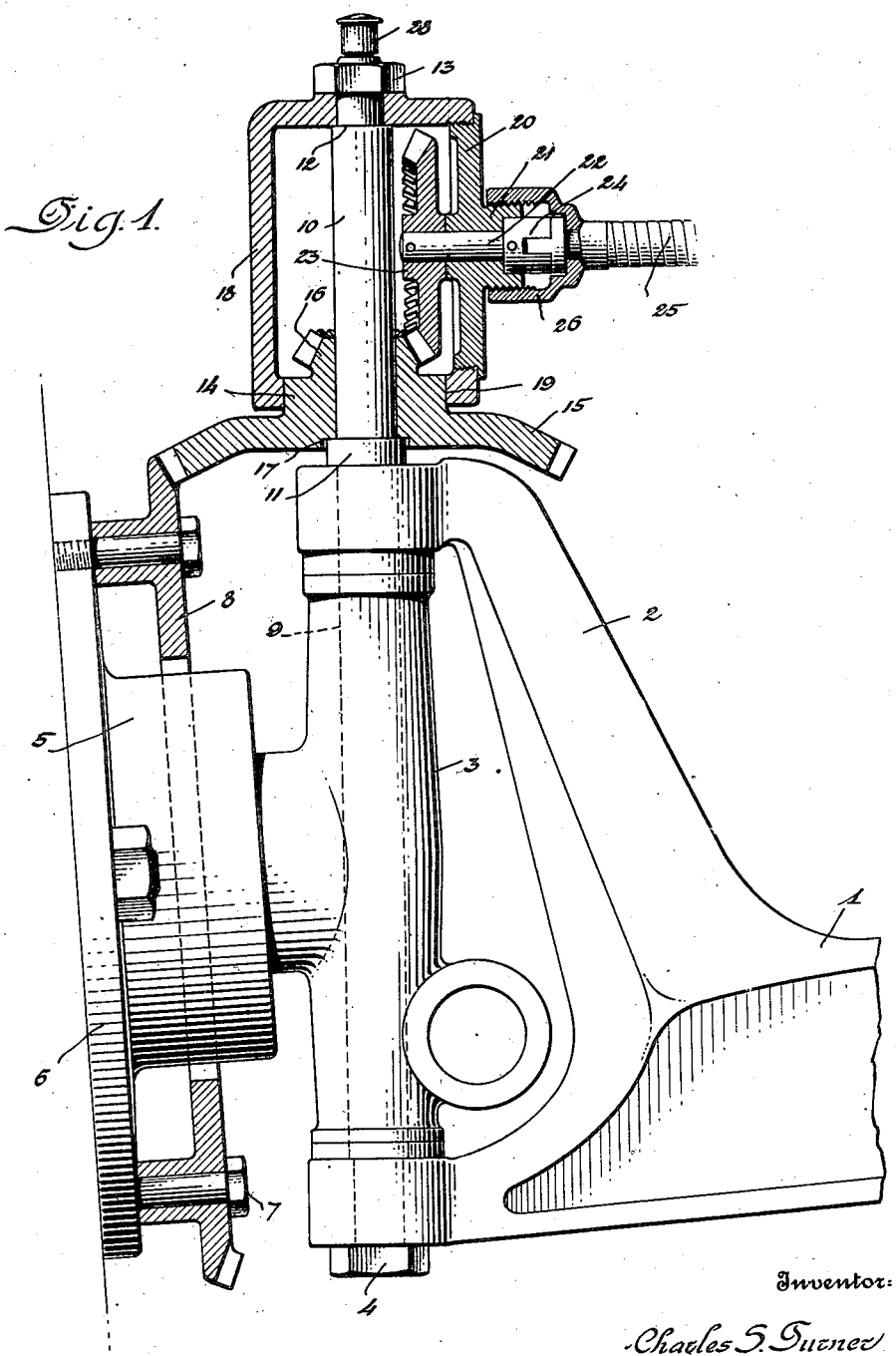
Figure 1 is a vertical sectional view of the speedometer gearing relative to a steering wheel hub and steering knuckle.

As showing the speedometer gearing in connection with a well known type of front axle assembly, I show a portion of a front axle 1 having a fork 2 for a steering knuckle 3, said steering knuckle being ordinarily held in place by a knuckle pin 4 which will permit of the steering knuckle being swung in a horizontal plane in the fork 2. The steering knuckle 3 is adapted to rotatably support the hub portion 5 of a front wheel and connected to the flange 6 of the hub 5, by screw bolts 7 or other fastening means, is a large beveled gear wheel or toothed ring 8. The axis of the hub 5 intersects the vertical axis of the knuckle pin 4 and as is the usual practice the hub 5 is inclined relative to the axis of the pin 4, but the upper edge of the beveled gear wheel 8 remains constantly in a predetermined arc relative to the axis of the knuckle bolt 4, consequently any gearing supported in the axis of the knuckle pin 4 may constantly mesh with the beveled gear wheel 8 of the steering wheel.

The usual Ford knuckle or king pin 4 has its head or upper end terminating at the upper arm of the fork 2 and in the preferred form of my invention, I withdraw this short knuckle pin and substitute therefor a knuckle or king pin 9 of greater length so that its upper portion 10 may extend above the fork. It is held in such position by a collar 11 on the pin bearing on the fork 2 and the extreme upper end of the pin 9 is reduced to form a shoulder 12 and receive a nut 13.

Rotatable on the upper portion 10 of the pin 9 is the hub portion 14 of a compound beveled gear wheel which includes a large gear wheel 15 meshing with the gear wheel or ring 8 and a small gear wheel 16, said gear wheel being on the upper end of the hub 14. The lower face of the large gear wheel 15 is recessed, as at 17, to provide clearance for the collar 11 and the large gear wheel may freely revolve on the upper portion of the pin 9.

Supported on the shoulder 12 of the pin and retained thereon by the nut 13 is a gear housing 18 having its lower wall provided with an opening 19 into which the hub 14 of the compound gear wheel extends. The housing 18 has a detachable plate or wall 20 provided with a bearing 21 for a gear shaft 22 on the inner end of which is mounted a beveled gear wheel 23 meshing with the small beveled gear wheel 16. On the outer end of the gear shaft 22 is a conventional form of coupling 24 for a flexible speedometer shaft 25. This shaft is also of a conventional form and has its flexible casing connected to the bearing 21 by a cap 26. The speedometer shaft 25 is adapted to extend to an ordinary speedometer or any other speed indicating instrument that may be actuated from one of the front steering wheels of an automobile.

Figure 2:
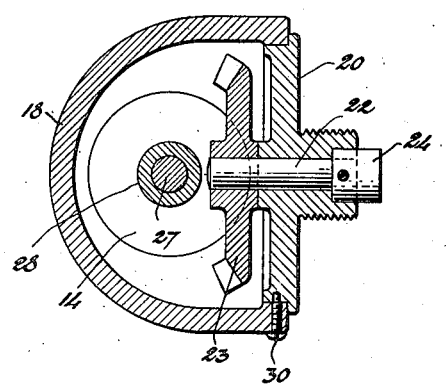
Fig. 2 is a horizontal sectional view of a speedometer gearing, illustrating a slight modification of my invention.
Figure 3:
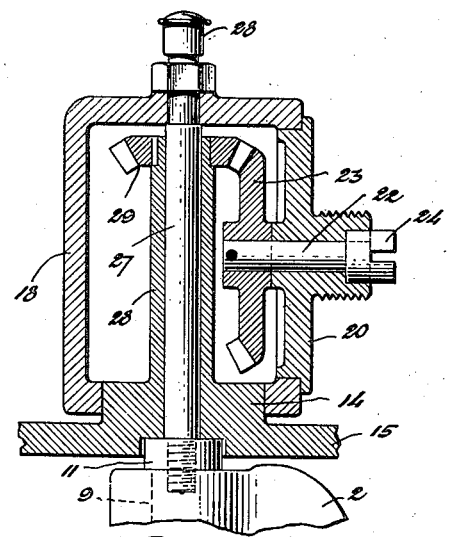
Fig. 3 is a vertical sectional view of the same.

Reference will now be had to Figs. 2 and 3. Instead of removing the usual Ford knuckle or king pin, I may provide the upper end of such pin with an extension member 27 that will serve the same purpose as the upper portion 10 of the pin 9. These Ford pins are usually provided with lubricant cups 28 and the extension member 27 may be mounted in the usual opening that accommodates the lubricant cup. Then, such cups may be placed on the upper end of the portion 10 of the pin 9 or the upper end of the extension member 27. Instead of using exactly the same type of compound gear, I may use a gear having a long hub 28 with a small beveled gear wheel 29 mounted on its upper end to mesh with the beveled gear wheel 23, and instead of attaching the detachable plate 20 to the housing 18 by screw threads, I may set said plate in the housing and secure it in place by a screw 30 or other fastening means.

Figure 4:
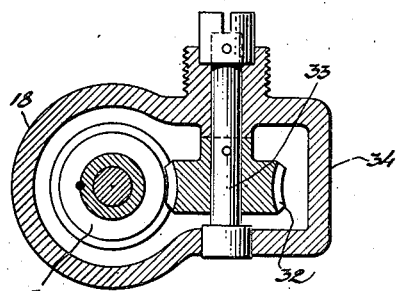
Fig. 4 is a horizontal sectional view of a worm gearing that may be used as a transmission in connection with the speedometer.
Figure 5:
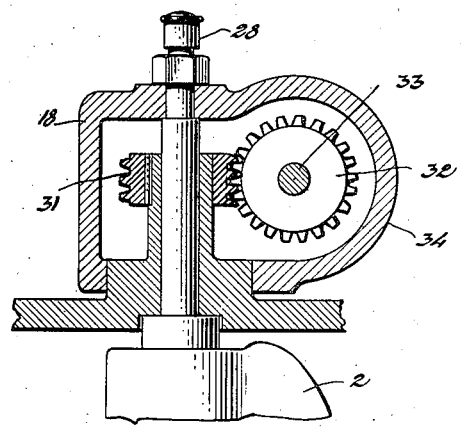
Fig. 5 is a vertical sectional view of the same.

There is also another change that I may make as illustrated in Figs. 4 and 5 showing the compound gear as including a worm 31 meshing with a worm wheel 32 on a shaft 33 journaled in an offset portion 34 of the gear housing 18. The shaft 33 is disposed with its axis in a plane at a right angle to the axis of the pin 9 or the pin extension member 27, and said shaft has provision so that a speedometer shaft may be coupled thereto.

In all instances the gear housing 18 is held stationary with the beveled gear wheels or transmission mechanism revolving therein and driven by the large gear wheel 15 meshing with the gear wheel or ring 8 of the automobile wheel. It is apparent that the manner of mounting the gear housing permits of a constant driving relation being maintained with the automobile wheel so that its speed may be transmitted to a speedometer or other speed indicating instrument.

I attach considerable importance to the fact that my gearing may be quickly installed on Ford cars now in use to permit of a speedometer being used, and while in the drawings there are illustrated the preferred embodiments of my invention, it is to be understood that the structural elements are susceptible to such changes, in size, shape and manner of assemblage as fall within the scope of the appended claims.

What I claim is:—

1. In gearing for driving indicators, wherein a gear is driven by a drive gear carried by a dirigible wheel of the vehicle, with the driven gear having its axis alined with the axis of the knuckle formation for the wheel, and wherein the driven gear is operably connected by gearing with the flexible connection leading to the indicating mechanism, means operative to house and support the gearing, said means including a hub carried by and integral with the driven gear, a support for the gear assembly, said support being axially alined with the axis of the knuckle formation, said support having a shoulder, and a housing having its top wall supported by said shoulder, and clamped thereon by a nut, said housing having dimensions such as to house the connecting gearing, the hub of the driven gear extending into the bottom of the housing to form a wall portion thereof and being active to prevent lateral movement of the bottom of the housing relative to the axis of rotation of the gear.

2. Gearing as in claim 1 characterized in that the driven gear hub is elongated axially and formed with zonal portions differing in diameter, a zonal portion of smaller diameter carrying a gear member of the connecting gearing.

3. Gearing as in claim 1, characterized in that the driven gear hub is elongated axially and formed with zonal portions differing in diameter, a zonal portion of smaller diameter carrying integral gear teeth, active in the connecting gearing, such zonal portion being positioned below the axis of the co-operating gear element of such connecting gearing.

4. Gearing as in claim 1, characterized in that the housing is provided with a removable side wall, said wall forming a support and bearing for a stub shaft extending into the housing at substantially right angles to the axis of the driven gear and having its inner end carrying a member of the connecting gearing.

5. In gearing for driving indicators wherein a gear is driven by a drive gear carried by a dirigible wheel of the vehicle with the driven gear having its axis alined with the axis of the knuckle formation for the wheel, and wherein the driven gear is operably connected by gearing with the flexible connection leading to the indicating mechanism, means operative to house and support the gearing, said means including an extension of the pin, of the knuckle formation projecting above the fork of such formation, said extension forming a continuation of the pin and having a shoulder spaced from the top of the fork, a housing supported by and clamped on said shoulder, said housing having dimensions to receive the connecting gearing of the gear assembly, said driven gear having an integral hub extending into the bottom of the housing to form a wall portion of the housing bottom and serve to prevent lateral movement of the lower portion of the housing relative to the axis of the drum gear, said driven gear having a recess on its under face, said pin extension carrying an enlargement between the bottom of the gear recess and the top of the fork.

6. Gearing as in claim 5 characterized in that the hub portion of the driven gear carries a gear face within the housing with the overall diameter of said face less than the diameter of the wall forming portion of the hub.

In testimony whereof I affix my signature in presence of two witnesses.

CHARLES S. TURNER.

Witnesses:
ANNA M. DORR,
KARL H. BUTLER.